United States Patent [19]

Schartz

[11] Patent Number: 4,643,441
[45] Date of Patent: Feb. 17, 1987

[54] SADDLE MOUNT DEVICE FOR A TRACTOR

[76] Inventor: Omar Schartz, Rte. 2, Box 76, Larned, Kans. 67550

[21] Appl. No.: 789,555

[22] Filed: Oct. 21, 1985

[51] Int. Cl.[4] .............................................. B60P 3/30
[52] U.S. Cl. ................................. 280/5 R; 224/42.43; 224/42.44; 280/760; 296/37.1
[58] Field of Search .......... 280/5 R, 5 A, 5 H, 153 R, 280/152 B, 760; 224/42.44, 42.43, 21, 32, 273; 172/451, 776, 817; 296/3, 37.1

[56] References Cited

U.S. PATENT DOCUMENTS

| | | | |
|---|---|---|---|
| 1,219,244 | 3/1917 | Campbell | 280/153 R |
| 1,314,225 | 8/1919 | Souchek | 280/153 R |
| 1,405,216 | 1/1922 | Holmes | 280/153 R |
| 1,463,944 | 8/1923 | Fishleigh | 280/153 R |
| 2,425,892 | 8/1947 | Michaels | 224/42.32 |
| 2,442,889 | 6/1949 | Deal | 296/3 |
| 2,499,654 | 3/1950 | Kuhlman | 280/760 X |
| 2,618,509 | 3/1950 | Carlson | 239/168 |
| 2,646,910 | 7/1953 | Wiershing | 224/42.44 |
| 2,660,452 | 1/1952 | Johnson, Jr. | 280/760 |
| 2,680,624 | 7/1949 | Pool et al. | 280/5 R |
| 2,946,598 | 7/1960 | Foster | 280/5 R |
| 3,396,983 | 8/1968 | Massey et al. | 280/5 R |
| 3,583,718 | 6/1971 | Meyer | 280/5 R |
| 4,022,331 | 5/1977 | Bean et al. | 414/555 |
| 4,277,008 | 7/1981 | McCleary | 224/273 |
| 4,351,535 | 9/1982 | Mead | 280/5 R |
| 4,489,791 | 12/1984 | Schneider | 172/776 |

Primary Examiner—John J. Love
Assistant Examiner—Mitchell J. Hill
Attorney, Agent, or Firm—E. Robert Newman

[57] ABSTRACT

An auxiliary tank mount carried by the rear axle and rear axle housing of a tractor for supporting a tank on the exterior side of each rear wheel. The mounting structure is attached to the axle housing between the rear wheel and cab, and extends around the front of the wheel to bear on an extension of the rear axle.

2 Claims, 2 Drawing Figures

SADDLE MOUNT DEVICE FOR A TRACTOR

TECHNICAL FIELD

This invention relates generally to structures for carrying auxiliary tanks on tractors and more particularly to a structure mounted on the tractor's rear axle.

BACKGROUND ART

In applying chemicals to a field, the positioning of the tanks which hold the chemicals has varied from being supported at the rear of the tractor frame, to being carried separately on an implement, to being mounted at the sides of the tractor frame ahead of the rear wheels. Today, the most common position is the latter.

The position of these tanks in relation to the tractor can affect the manner in which the tractor can be used as well as its driving characteristics. One problem with placing the tanks at the sides, ahead of the rear wheels, is that visibility of the ground alongside and in front of the driver is restricted, making it difficult to accurately follow crop rows and to watch for small animals. A second problem associated with this placement of tanks is that the operator is hampered in mounting and dismounting the tractor. These problems are due not only to the location of the tanks themselves, but also to that of the mounting hardware and structure.

In addition, when these tanks are mounted forward of the rear axle, considerable weight is shifted towards the front axle. Since tractors are generally designed to operate most effectively when additional loads are centered over the rear axle, difficulties in handling, particularly in relation to the turning characteristics of the tractor, are experienced. More importantly, the resulting stress to the front axle and wheels could be hazardous.

DISCLOSURE OF THE INVENTION

It is therefore a general object of the present invention to provide a new and novel auxiliary tank mount for a tractor.

Another object is to provide a tank mount which allows better visibility to the operator.

A further object is to provide a tank mount which will not hamper the ability of the operator to mount and dismount the cab of the vehicle.

Yet another object of the present invention is to provide a tank mount which will distribute the weight of the tanks and their contents such that substantially no additional weight is carried by the front axle and tires of the tractor.

More generally it is an object of the present invention to provide an auxiliary tank mount which is carried by the rear axle and rear axle housing of a tractor and supports a tank on the exterior side of each rear tractor wheel. The mounting structure is attached to the axle housing between the rear wheel and cab, and extends around the front of the wheel to bear on an extension of the rear axle.

These and other objects, advantages and novel features of the present invention will become apparent from the following detailed description of the invention when considered in conjunction with the accompanying drawings.

BEST MODE FOR CARRYING OUT THE INVENTION

Figure 1:
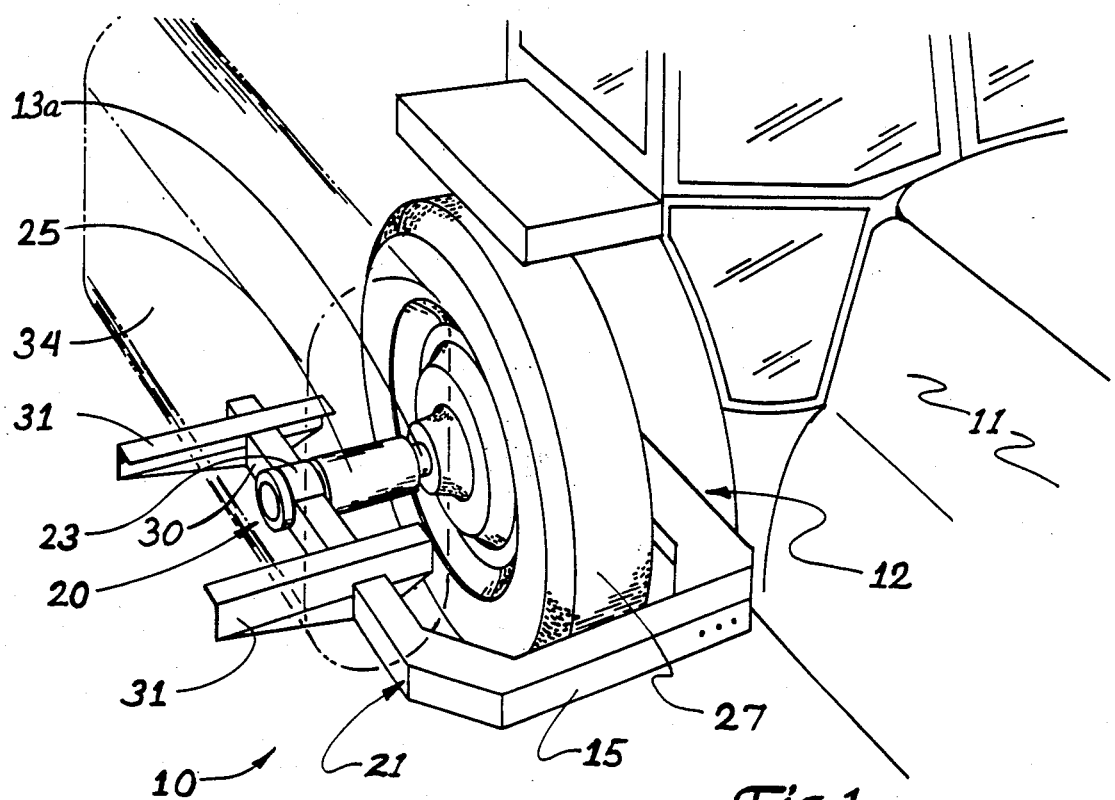
FIG. 1 is a perspective view of the auxiliary tank mount affixed in working position on a tractor with a mounted tank in phantom lines.

Referring now to the drawings, in which identical or corresponding parts are indicated by the same reference character throughout the several views, and more particularly to FIG. 1, whereon the auxiliary tank mount device is designated generally at 10 and is shown mounted on a tractor 11. Mount device 10 is substantially comprised of two elements, generally "U"-shaped mounting bracket 15 and a bearing mount assembly, designated generally at 20.

Figure 2:
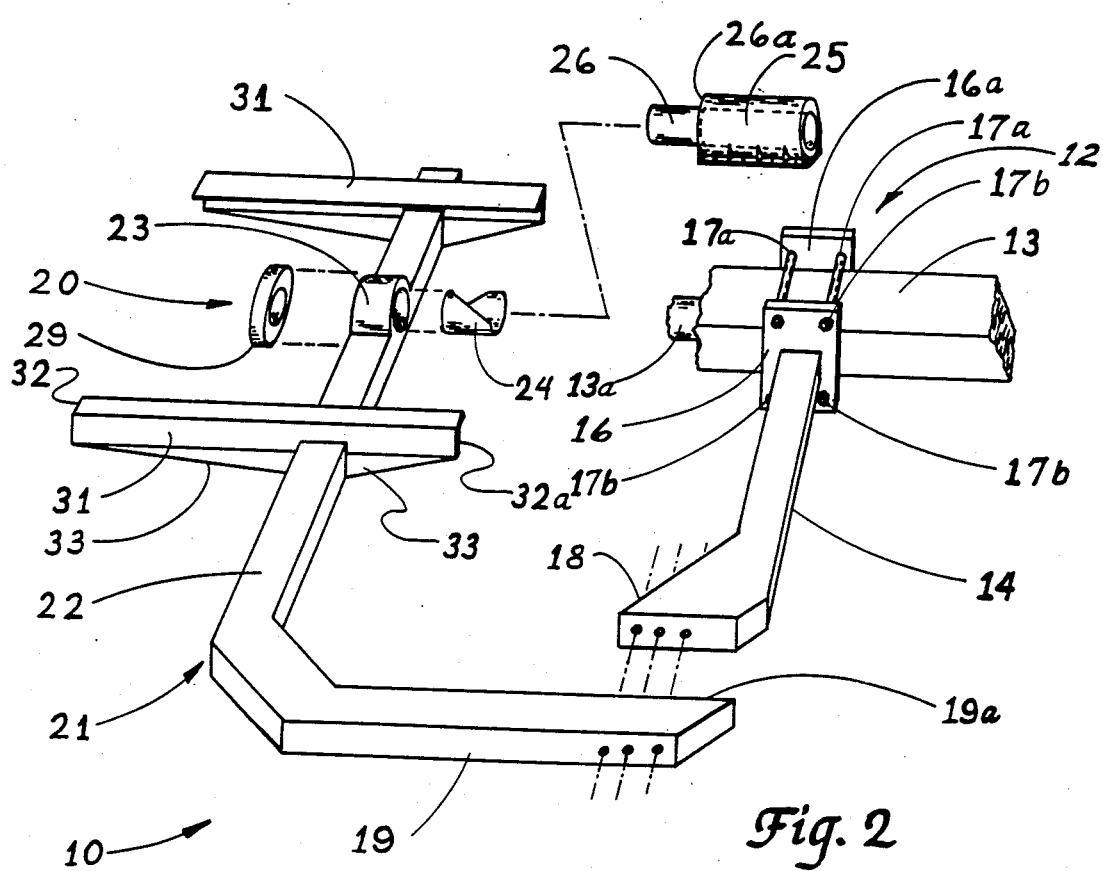
FIG. 2 is a partially exploded perspective view of the auxiliary tank mount device.

Referring now to FIG. 2, "U"-shaped bracket 15 consists of a primary assembly, designated generally at 12, and a secondary assembly, designated generally at 21. Primary assembly 12 is attached to the housing 13 of rear axle 13a between the rear tire 27 and cab of tractor 11. Primary assembly 12 includes an elongated arm 14 which has a rectangular plate 16 affixed on one end perpendicular to its longitudinal axis. Plate 16 has a length and width greater than the cross-section of arm 14, forming an edge around its perimeter in which are four apertures (not shown), one located in each corner.

A second plate 16a, identical to plate 16, also having four apertures 17a, is positioned parallel and face-to-face with plate 16. Axle housing 13 is sandwiched between plates 16 and 16a and four nut and bolt combinations 17b pass through the apertures in the corners of plates 16 and 16a. Arm 14 is positioned so as to project horizontally forward from axle housing 13. Once tightened, the four nut and bolt combinations 17b will squeeze plates 16 and 16a against axle housing 13, holding arm 14 rigidly in place. If axle housing 13 does not have vertical sides against which plates 16 and 16a will be flush, other provisions well within the knowledge of one skilled in the art are available which will prevent arm 14 from rotating about axle housing 13.

The free end of arm 14 has a triangular portion 18 projecting horizontally outwards from tractor 11, to form a brace for supporting "L"-shaped secondary assembly 21. The free end 19a of the forward leg 19 of assembly 21 is bolted to portion 18, thereby forming "U"-shaped mounting bracket 15, which surrounds the front half of rear tire 27 as best seen in FIG. 1.

Bearing mount assembly 20 includes a sleeve 25 and an axle extender 26. Sleeve 25 slides over the projecting end of axle 13a and is rigidly affixed thereto in a conventional manner. Axle extender 26 is coaxially affixed to the exposed end of sleeve 25 and projects slightly beyond the rearward leg 22 of "L"-shaped assembly 21. Also included in bearing mount 20 is a collar-shaped bearing 23 and a nylon sleeve-type bearing 24 adapted to fit within collar-shaped bearing 23 and over axle extender 26. The rearward end 22a of rearward leg 22 of "L"-shaped assembly 21 is affixed to collar-shaped bearing 23. A retainer ring 29 clamps onto the projecting end of axle extender 26 and serves to retain sleeve type bearing 24 within collar-shaped bearing 23. A washer (not shown) placed over axle extender 26 serves to restrict movement of sleeve type bearing 24 towards tractor 11.

A support member 30 is affixed to collar-shaped bearing 23 distal its affixation to leg 22 and serves to support one of a pair of mounting members 31. Members 31 are affixed on either side of collar-shaped bearing 23, one to leg 22 and one to support member 30. Both are mounted in a horizontal plane and perpendicular to member 30 and leg 22. Each mounting member 31 includes an angle iron 22, and two coplanar triangular plates 33, which connect vertical leg 32a of angle iron 32 to support member 30 or leg 22 on either side thereof. An auxiliary tank 34 (shown in broken lines in FIG. 1) may then be affixed to the top of mounting members 31 in a conventional manner.

Once tank mount device 10 is mounted on tractor 11, as shown in FIG. 1, tank 34 is mounted on members 31 with its center of gravity generally centered over bearing housing 23. Thus, all of the weight of tank 34 is carried by rear axle 13a, and axle housing 13. Ordinarily an auxiliary tank will be carried by a mount device 10 on each side of tractor 11.

It will be readily understood that the particular disposition or arrangement or nature of the elements of the invention are not of the essence of the invention, and that many variations, substitutions, and modifications may be made, in departure from their particular construction and characterization in the drawings and foregoing description, without departing from the true spirit of the invention. It is therefore to be understood that the invention should be limited only by the breadth and scope of the appended claims.

What is claimed is:

1. A saddle mount device for a tractor having its rear axle supported by an axle housing and rear wheels located on either side of the tractor body, comprising:
   a cylindrical axle extension rigidly and coaxially mounted to the outer end of the rear axle;
   a collar-shaped bearing mounted on said axle extension, for support upon said axle as it turns;
   a substantially horizontal "U"-shaped bracket rigidly connected at one end to said collar-shaped bearing and at the other end to the rear axle housing between the rear wheel and the tractor body, and wherein the dimensions of said axle extension and said "U"-shaped bracket are such that it will not contact said wheel; and
   horizontal mounting member means, having a center of gravity generally centered over the longitudinal axis of said rear axle and affixed to said "U"-shaped bracket in the vicinity of its connection to said collar-shaped bearing.

2. The saddle mount device of claim 1, wherein said "U"-shaped bracket is formed out of a substantially "L"-shaped member and an elongated arm, the rigid connection of said other end of said "U"-shaped bracket to said rear axle housing includes means for operably connecting one end of said elongated arm to the axle housing, and means for operably connecting the other end of said elongated arm to the free end of said "L"-shaped member.

* * * * *